United States Patent

[11] 3,609,494

| [72] | Inventors | Tadashi Takahashi;<br>Kazuo Onishi, both of Hitachi-shi, Japan |
|---|---|---|
| [21] | Appl. No. | 775,806 |
| [22] | Filed | Nov. 14, 1968 |
| [45] | Patented | Sept. 28, 1971 |
| [73] | Assignee | Hitachi Ltd.<br>Tokyo, Japan |
| [32] | Priority | Nov. 17, 1967 |
| [33] | | Japan |
| [31] | | 73650/67 |

[54] SPEED-CONTROLLING APPARATUS FOR DC MOTOR
12 Claims, 5 Drawing Figs.

[52] U.S. Cl. .................................................... 318/328,
318/345
[51] Int. Cl. ...................................................... H02p 5/16
[50] Field of Search........................................... 318/146,
310, 326, 327, 328, 341, 345

[56] References Cited
UNITED STATES PATENTS
3,458,792 7/1969 Jabbar ............................ 318/328

Primary Examiner—Oris L. Rader
Assistant Examiner—Robert J. Hickey
Attorney—Craig & Antonelli ABSTRACT: A speed-controlling apparatus for DC motors, wherein a closed series circuit is constituted by a DC power source, a DC motor and the emitter and collector of a first transistor, whereby the conductivity between the emitter and the collector of the transistor is controlled to thereby achieve constant speed control with respect to the DC motor. Further, a biasing circuit for supplying a constant base current to a second transistor is formed by a Zener diode and a resistor. The output of an AC generator which is mechanically conducted with said DC motor is rectified by means of a diode. The output circuit of the AC generator is combined with said biasing circuit in such polarity that the current of said biasing circuit is positively shunted by the rectified output current, so that the conductivity between the emitter and the collector of the first transistor is controlled in accordance with variation in the collector potential of the second transistor, thereby maintaining the speed of the DC motor constant.

INVENTOR
TADASHI TAKAHASHI
KAZUO ONISHI

BY Craig & Antonelli
ATTORNEYS

SPEED-CONTROLLING APPARATUS FOR DC MOTOR

BACKGROUND OF THE INVENTION

1. Field of the Invention

This invention relates to a speed-controlling apparatus for DC motors.

2. Description of the Prior Art

In order to drive a DC motor at a constant speed, provision is made for means for detecting the speed of rotation of the motor as voltage by a DC generator or AC generator, comparing the voltage with that corresponding to a predetermined speed of rotation, and controlling the power supplied to the DC motor so that the difference between the voltages becomes zero or smaller than a predetermined value. To achieve such voltage comparison, an additional power source providing the reference voltage is required which causes inconvenience in handling the apparatus. In practice, therefore, use is made of a constant voltage element such as a Zener diode or the like instead of such reference voltage source. More specifically, design is made such that when the generator voltage corresponding to the speed of rotation of the motor reaches the breakdown voltage of the Zener diode, a current resulting from the breakdown of the Zener diode is caused to flow through the base and emitter of the second transistor. Further, there is provided means for rendering the first transistor nonconductive when the second transistor is rendered conductive between the base and the emitter thereof by the current flowing therethrough, thereby decreasing the current flowing through the motor. Thus, the speed of rotation of the motor is maintained constant. However, since with the Zener diode it is at 6-7 v. or higher that the desired voltage characteristic can be secured, the generator voltage corresponding to a desired speed of rotation should be higher than said voltage value at least. Therefore, difficulty is encountered in miniaturizing the generator. Furthermore, use of an AC generator is very advantageous in respect of manufacture, maintenance and life, but in order to cause a current to flow through the base and emitter of the transistor via the Zener diode, it is essential that a rectifier diode be inserted between the AC generator and the Zener diode. However, a voltage drop (barrier voltage) is caused across the diode even when it is operated in the forward direction, and also between the base and the emitter of the transistor even when the latter is in the conducting state. Such barrier voltage serves to prevent the voltage of the AC generator from being imparted to the Zener diode. It is varied with temperature variation in such a manner that the higher the temperature, the lower the voltage. Therefore, when a breakdown occurs in the Zener diode the voltage of the AC generator is decreased with a rise in temperature. This causes such a phenomenon that with a rise in temperature the speed of rotation is reduced to be lower than a predetermined one.

As a means to convert the speed of rotation of a motor to a voltage, there has been proposed a method of utilizing the terminal voltage of the motor without using a generator. However, it is difficult to accurately determine the speed of rotation of a DC motor from the terminal voltage thereof since the motor includes the contacting portion between the commutator and the brushes and the electrical resistance of the contacting portion tends to vary.

SUMMARY OF THE INVENTION

It is an object of the present invention to provide effective means to maintain the speed of rotation of an electric motor at a predetermined value.

Another object of the present invention is to provide means capable of controlling an electric motor by using a generator with a relatively low power capacity.

Still another object of the present invention is to provide such an arrangement that a power source used as the reference to produce a signal for controlling an electric motor can be utilized also as power source to drive the motor.

Still another object of the present invention is to provide such an arrangement that means for producing a signal to control an electric motor is not affected by temperature.

A further object of the present invention is to provide a substantially stabilized reference power source of simplified construction.

A further object of the present invention is to provide control means stabilized with respect to power source voltage variations.

A still further object of the present invention is to provide control means capable of selecting a variety of desired speeds of rotation.

A still further object of the present invention is to provide such an arrangement that power consumption of transistors incorporated in control means is minimized by making the transistors to work either in the conducting state or the nonconducting state so that inexpensive transistors may be used.

In order to accomplish the foregoing objects, the following arrangement has been adopted in accordance with an embodiment of the present invention: There is provided a transistor which is supplied with a base current from a substantially constant current-biasing circuit so as to be rendered conductive thereby. Design is made such that a current is caused to flow through an electric motor to be controlled when the transistor is in the conducting state. Further, part of the bias current to be supplied from said biasing current to the base of the transistor is positively shunted by the output of a generator which is mechanically connected with the motor to be controlled, thereby reducing the conductivity of said transistor. Thus, at least the current flowing through the motor to be controlled is decreased so that the speed of rotation of the motor is maintained constant.

DESCRIPTION OF THE PREFERRED EMBODIMENT

Figure 1:
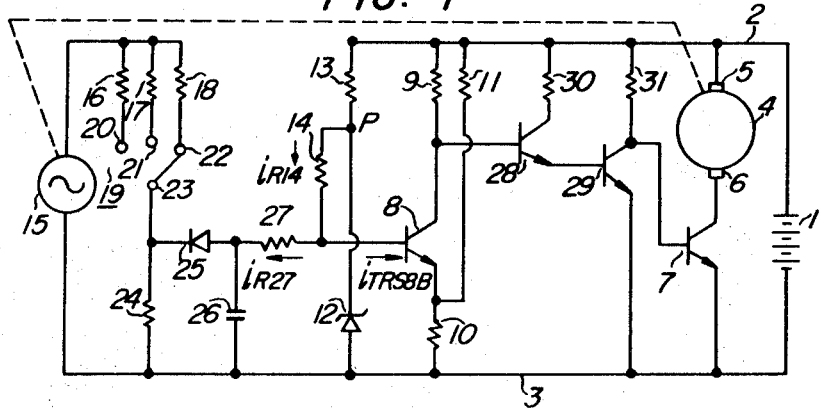
FIG. 1 is an electrical connection diagram showing the controlling apparatus according to an embodiment of the present invention.

The present invention will be described in detail with respect to the embodiment shown in the drawings. Referring to FIG. 1, the reference numeral 1 represents a power source having the positive terminal connected with a feeder line 2 and the negative terminal with another feeder line 3. The reference numeral 4 denotes the armature of a DC motor to be controlled, which has a first brush 5 connected with the feeder line 2 and a second brush 6 connected with the collector of a first NPN transistor 7. The emitter of the first transistor 7 is connected with the other feeder line 3, so that a current flowing through the armature 4 is controlled in accordance with the extent of conduction between the emitter and the collector of the transistor. The reference numeral 8 indicates a second NPN transistor having the collector connected with the feeder line 2 through a resistor 9 and the emitter coupled to the feeder line 3 through a resistor 10. The emitter side end of the resistor 10 is connected with the feeder line 2 through a resistor 11. The reference numeral 12 denotes a Zener diode having the anode connected with the feeder line 3 and the cathode coupled to the feeder line 2 through a resistor 13 so that a constant voltage is established at the connection point P. The reference numeral 14 represents a bias current resistor connected between the connection point P and the base of the transistor 8, the value for the resistor 14 being selected to be very high as compared with the value of the internal resistance between the base and the emitter of the transistor 8 and the value for the resistor 10. The reference numeral 15 denotes an AC generator mechanically connected with the armature 4, one of the terminals thereof being connected with the feeder line 3 and the other terminal being coupled to a common terminal for resistors 16, 17 and 18. The reference numeral 19 indicates a changeover switch of which fixed contacts 20, 21 and 22 are connected with the other ends of the resistors 16, 17 and 18 respectively, a movable contact 23 being connected with the feeder line 3 through a resistor 24. Thus, a voltage available from the AC generator 15 is divided between the resistor 24 and each of the resistors 16, 17 and 18. The reference numeral 25 represents a rectifier diode having the cathode connected with the changeover switch side end of the resistor 24. The anode of the diode 25 is connected with the feeder line through a capacitor 26 and with the base of the second transistor 8 through a resistor 27. The reference numerals 28 and 29 represent amplifier NPN transistors respectively. The base of the transistor 28 is connected with the collector of the transistor 8, the emitter thereof is connected with the base of the succeeding transistor 29, and the collector thereof is connected with the feeder line 2 through a resistor 30. The emitter of the transistor 29 is connected with the feeder line 3, and the collector thereof is connected with the base of the first transistor 7 and also with the feeder line 2 through a resistor 31.

The operation of the present apparatus will be described below.

First, assume that the armature 4 is stopped. Then, the voltage available from the AC generator 15 mechanically connected with the armature 4 is zero so that no voltage occurs across the resistor 24. Thus no voltage is obtained across the capacitor 26 connected with the resistor 24 through the diode 25. On the other hand, the voltage at the connection point P between the Zener diode 12 and the resistor 13 with respect to the feeder line 3 is maintained at a predetermined value by the action of the Zener diode 12. The voltage at the point P results in a sufficient forward bias current flowing between the base and the emitter of the transistor 8 through the resistor 14. Thus conduction takes place between the emitter and the collector of the transistor 8 so that the collector potential thereof is decreased. The result is that a nonconductive state occurs between the emitter and the collector of the transistors 28 and 29. Consequently, the transistor 7 connected in series with the armature 4 is rendered conductive so that a high current is caused to flow through the armature 4. This current, coupled with the action of magnetic flux produced by fixed magnetic poles (not shown), results in a turning force of the armature 4, as is the case with an ordinary DC motor. As the speed of rotation of the armature 4 increases, the voltage available from the AC generator 15 builds up so that the voltage drop across the resistor 24 is increased accordingly. The voltage across the resistor 24 is rectified by the diode 25 and then smoothed out by means of the capacitor 26. The polarity of the smoothed voltage across the capacitor 26 is positive (+) at the feeder line 3 side and negative (−) at the resistor 27 side. Thus, it can be considered that a power source of opposite polarity to the base-emitter forward direction is connected between the base and the emitter of the transistor 8 including the resistor 10 through resistor 27. Part of the bias current flowing from the point P to the base of the transistor 8 through the resistor 14 is positively shunted through the resistor 27 by the aforementioned power source. However, the magnitude of the bias current flowing through the resistor 14 remains substantially constant irrespective of the amount of the shunted current since the resistance of the resistor 14 is set to a much higher value than the impedance of the base-emitter circuit of the transistor 8 and that of the shunt circuit. Thus, as the shunted current increases (the voltage across the capacitor 26 builds up as the speed of rotation of the armature 4 is sufficiently increased), insufficient current flows in the base of the transistor 8 so that the conductivity between the emitter and the collector of the transistor 8 is reduced. As a result, the collector potential increases with respect to the feeder line 3, rendering the transistors 28 and 29 conductive so that the conductivity of the transistor 7 is reduced to decrease the current flowing through the armature 4. In this way, it is possible to prevent the speed of rotation of the armature 4 from being further increased.

Assume now that the speed of rotation of the armature 4 tends to decrease under the aforementioned condition (when the armature is rotated at a sufficiently high speed). Then, the voltage available from the AC generator 15 decreases so that the voltage across the capacitor 26 also decreases. As a result, the current shunted through the resistor 27 is decreased so that an increased current flows in the base of the transistor 8. Thus, the conductivity between the emitter and the collector of the transistor 8 is recovered so that the collector potential is decreased. On the other hand, the conductivity of the transistors 28 and 29 is decreased, while the conductivity of the transistor 7 is increased so that an increased current is caused to flow through the armature 4, whereby the output torque of the armature is increased so that the speed of rotation thereof is prevented from being decreased. This speed of rotation assumes the set value.

Figure 1A:
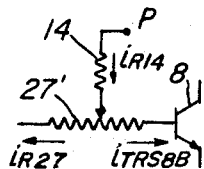
FIG. 1a is a circuit diagram showing a modified form of the biasing circuit of FIG. 1 using a potentiometer.

In such controlling process, part (in some cases, the whole) of the bias current flowing through the resistor 14 is shunted through AC generator 15. It will be appreciated therefore that the voltage available from the generator may be very low, and that the set value for the speed of rotation of the armature 4 can be varied by changing the amount of a shunted current by selecting the desired one of the resistors 16, 17 and 18 by means of the changeover switch 19. Furthermore, it will be readily apparent to those skilled in the art that the amount of shunted current can also be adjusted by using a potentiometer-type resistor 27' as shown in FIG. 1a, in place of resistor 27 connecting that end of the resistor 14 which is remote from the connection point P to an intermediate terminal 2 of potentiometer 27'.

In this way, the speed of rotation of the armature 4 is so controlled as to be maintained constant irrespective of variations of load torque and so forth. In case the voltage of the power source 1 is changed to a higher value, for example, however, the speed of rotation of the armature 4 tends to be shifted to a higher speed. This is because when operated at a low voltage, a Zener diode represents a positive characteristic with respect to voltage variation, that is, if the voltage of the power source 1 is increased, then the voltage at the point P is also increased so that the bias current flowing through the resistor 14 is increased with the result that the conductivity of the transistor 8 with respect to the voltage available from the AC generator 15 is increased.

To solve this problem, the resistor 10 is inserted in the emitter circuit of the transistor 8, and the voltage of the feeder line 2 is applied to the resistor 10 through resistor 11. Thus, if the voltage of the power source 1 is increased, then the emitter potential of the transistor 8 is also increased so that the reverse bias voltage applied to the transistor is increased. Consequently, the aforementioned speed variation can be compensated.

Figure 1B:
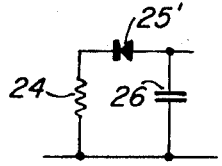
FIG. 1b is a circuit showing a modified form of the temperature-sensitive element of FIG. 1.

It is well known in the art that the building-up voltage characteristic occurring between the base and the emitter of a transistor is negatively varied with respect to temperature variation. The transistor 8 used in the present control circuit also represents a similar characteristic variation. The characteristic variation is such that as the temperature increases, the current flowing in the base of the transistor is increased. However, since the forward building-up voltage characteristic of the diode 25 inserted in the circuit path extending from the AC generator 15 to the capacitor 26 is also varied in a manner similar to the case of the building-up voltage characteristic between the base and the emitter of the transistor 8, the shunted current tends to be increased. Consequently, these characteristic variations offset each other so as to have no effect on the operation of the apparatus. Such offsetting action can be very conveniently produced in the present controlling circuit using the shunting system. Furthermore, in the case where the AC generator 15 is used, both the rectifying action and the aforementioned offsetting action can be produced. It will be apparent that when a DC generator is used as means for converting the speed of rotation of the armature 4 to an electrical quantity instead of the AC generator 15, any type of variator 25' which represents a negative characteristic with respect to temperature is employed instead of the diode 25, as shown in FIG. 1b.

Figure 2:
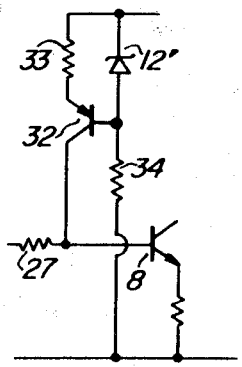
FIG. 2 is a circuit diagram showing a modified form of the biasing circuit using transistors.

Description will now be made of a modified form of the biasing circuit for supplying a bias current to the base of the transistor 8, with reference to FIG. 2. In the FIG. 2 arrangement, use is made of Zener diode 12' and PNP transistor 32. The emitter of the transistor 32 is connected with the feeder line 2 through a resistor 33, and the collector thereof is connected with the base of the transistor 8. The Zener diode 12' is connected in parallel with the base-emitter circuit of the transistor 32 including the resistor 33, and a resistor 34 is connected between the base of the transistor 32 and the feeder line 3. In such circuit, the Zener voltage of the Zener diode 12' is applied in the forward direction between the base and emitter of the transistor 32 through the resistor 33. Thus, the current caused to flow through the resistor 33 by the transistor 32 is such that the sum of the voltage across the resistor 33 and the voltage between the base and the emitter of the transistor 32 becomes equal to the Zener voltage. That is, the voltage across the resistor 33 is controlled so as to be constant at all times. Thus, a constant current-biasing circuit is realized.

It will be readily apparent that various other modifications to the biasing circuit become possible.

In some applications, it is advantageous to use a transistor either in the conducting state or the nonconducting state. That is, such mode of use is advantageous in that the power capacity of the transistor may be low since the power consumption of the transistor per se can be minimized.

Figure 3:
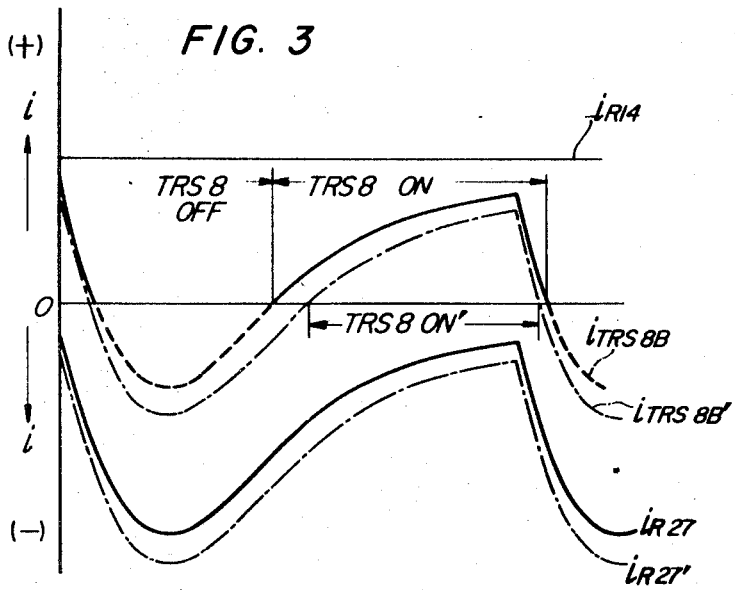
FIG. 3 is a view showing current waveforms useful for explaining the operation of the present controlling apparatus which is performed by rendering transistors conductive or nonconductive.

In accordance with the present invention, this can be achieved as follows: Description will be made with reference to FIG. 3. Design is made such that the output of the generator 15 is not completely smoothed out by the capacitor 26 but a shunted current $i_{R27}$ containing a ripple component is made to flow through the resistor 27. This shunted current $i_{R27}$ is negative, with a bias current $i_{R14}$ supplied to the base of the transistor 8 being positive. The value of a current $i_{TRS8B}$ flowing in the base of the transistor 8 is $(i_{R14}-i_{R27})$, and this contains a ripple component. Therefore, by positioning the operational level 0 of the transistor 8 in this ripple component, the transistor 8 is maintained either in the "on" state or the "off"-state.

In this case, the speed of rotation is controlled in the following manner: In case the armature 4 is rotated at a desired speed and the shunt current flowing through the resistor 27 is $i_{R27}$, then the current flowing in the base of the transistor 8 is $i_{TRS8B}$. In such a case, the transistor 8 is rendered conductive during a period "TRS8 ON," so that a current flows through the armature 4. Now, assume that the speed of rotation of the armature 4 is increased, then the voltage induced in the AC generator 15 is increased so that the shunt current is increased up to $i_{R27}'$. As a result, the current flowing in the base of the transistor 8 is decreased down to $i_{TRS8B}'$, and the period of conduction of the transistor 8 is reduced to "TRS8 ON." Thus, the mean value of the current flowing through the armature 4 is decreased so that the latter is decelerated.

Such "on–off" control can be achieved without smoothing the output of the AC generator 15, but by smoothing it to a certain degree, the slope of the waveform is decreased, which coupled with variation of the mean value, results in an enhance accuracy of control.

Although, in the foregoing description has been made of the case where use is made of NPN transistors, it will be readily apparent that the present invention can be practiced also by using PNP transistors.

A concrete example will be given below:

| | |
|---|---|
| Power source 1 | 12 v. |
| Electric motor to be controlled | Rated voltage 10–16 v. |
| | Rated Torque 40 g.-cm. |
| | Rated current 250 ma. |
| | Number of revolutions 3,000 r.p.m. |
| Transistor 7 | 2SC830 (HITACHI) |
| Transistors 8, 28, 29 | 2SC281 (HITACHI) |
| Zener diode 12 | 1S757 (HITACHI) |
| | Zener voltage 7 v. |
| Diode 25 | 1S1219 (HITACHI) |
| AC generator 15 | In case a resistor of 10 KΩ is connected with it through a diode, the maximum voltage across the resistor is 0.3 v. when it is rotated at 3,000 r.p.m. |
| Resistors 10, 11, 16, 17, 18, 24 | Not used |
| Resistor 9 | 120 KΩ |
| Resistor 13 | 4.7 KΩ |
| Resistor 14 | 220 KΩ |
| Resistor 27 | 100 KΩ potentiometer type resistor of which the movable arm is connected with the resistor 14. |
| Resistor 30 | 33 KΩ |
| Resistor 31 | 680 Ω |
| Capacitor 26 | 0.5 μf. |
| Result of test | |
| Load characteristic | Variation within 50 r.p.m. at 0–40 g.-cm. (Set speed of rotation: 3,000 r.p.m.) |
| Temperature characteristic | Variation within 60 r.p.m. at −10° C.–+60° C. (Set speed of rotation: 3,000 r.p.m.) |
| Voltage characteristic | Variation within 40 r.p.m. at 10–16 v. (Set speed of rotation: 3,000 r.p.m.) |

We claim:
1. A control apparatus comprising:
an electric motor;
a DC power source;
a first transistor connected between said electric motor and said DC power source;
a generator mechanically connected with said motor;
second transistor coupled to said first transistor to control the conduction thereof, whereby said DC power source will supply current to said motor through said first transistor;
a substantially constant current-biasing circuit connected to the base of said second transistor for supplying current thereto; and
means, connected between said generator and said biasing circuit and responsive to the output of said generator for positively shunting current delivered by said biasing circuit, said shunting means including a temperature-sensitive element for cancelling the variations in the conductivity of said second transistor due to temperature change, said temperature-sensitive element comprising a diode connected in series with said generator and the connection of said biasing circuit with said second transistor whereby the speed of said motor will be maintained at a constant rate.

2. A control apparatus according to claim 1, wherein the output of said generator is connected to said housing means through a variable resistor changeover switch, and wherein said diode has one electrode thereof connected to said changeover switch and the other electrode thereof connected through a resistor is the base of said second transistor.

3. A control apparatus according to claim 2, wherein the junction point of said diode and resistor is connected through a capacitor to one side of said DC power source.

4. A control apparatus according to claim 2, wherein the polarities of the respective electrodes of said diode and said second transistor which are connected to said resistor are the same.

5. A control apparatus according to claim 1, wherein said means for positively shunting at least part of the bias current includes a varistor representing a negative characteristic with respect to temperature variation.

6. A control apparatus according to claim 1, wherein an AC generator is used as the generator mechanically connected with the electric motor, and said generator is connected with the biasing circuit through at least one diode.

7. A control apparatus according to claim 1, wherein said means for positively shunting at least part of the bias current includes a resistance element of which the resistance value can be artificially changed.

8. A control apparatus according to claim 1, wherein the base of said second transistor is connected with one terminal of a potentiometer-type resistor, the other terminal of said resistor is connected with said shunting means, and the bias current is supplied to the intermediate terminal of said resistor.

9. A control apparatus according to claim 1, wherein said biasing circuit includes a series circuit of a Zener diode and a resistor which is connected across a pair of power lines, and a terminal of said Zener diode is connected with the base circuit of said second transistor through a high resistance.

10. A control apparatus according to claim 1, wherein said biasing circuit includes a third transistor of which the emitter and collector are connected with a power line and the base circuit of said second transistor, respectively, the emitter circuit of said third transistor further has a resistor and Zener diode inserted therein, and wherein said third transistor further has a resistor connected between its base and another power line.

11. A control apparatus according to claim 3, further including a first resistor inserted in the emitter circuit of said second transistor, and wherein a power source voltage is applied to the emitter side terminal of said first resistor through a second resistor.

12. A control apparatus according to claim 1, wherein said generator is an AC generator, and including means for rectifying and smoothing the output of said AC generator to a current containing a ripple component, whereby the bias current is shunted so that the base current level which renders said second transistor operative falls within the range of the ripple component.